US007684753B2

(12) United States Patent
Ionescu et al.

(10) Patent No.: US 7,684,753 B2
(45) Date of Patent: Mar. 23, 2010

(54) METHOD AND DEVICE FOR TRANSMISSION PARAMETER SELECTION IN MOBILE COMMUNICATIONS

(75) Inventors: Dumitru Mihai Ionescu, Dallas, TX (US); John Terry, Garland, TX (US); Victor Stolpman, Irving, TX (US); Olav Tirkkonen, Helsinki (FI); Pirjo Pasanen, Vantaa (FI)

(73) Assignee: Nokia Corporation, Espoo (FI)

( * ) Notice: Subject to any disclaimer, the term of this patent is extended or adjusted under 35 U.S.C. 154(b) by 1246 days.

(21) Appl. No.: 10/895,816

(22) Filed: Jul. 21, 2004

(65) Prior Publication Data

US 2006/0019602 A1    Jan. 26, 2006

(51) Int. Cl.
  *H04B 1/60* (2006.01)
  *H04B 1/00* (2006.01)
(52) U.S. Cl. .................. 455/10; 455/65; 455/504; 455/522
(58) Field of Classification Search .......... 455/10, 455/500–506, 63.1, 65, 67.11, 68–69, 453; 375/142, 144, 148, 150; 370/208, 252, 318
See application file for complete search history.

(56) References Cited

U.S. PATENT DOCUMENTS

| | | | |
|---|---|---|---|
| 6,603,745 B1 * | 8/2003 | Antonio et al. | 370/318 |
| 6,917,821 B2 * | 7/2005 | Kadous et al. | 455/562.1 |
| 7,020,073 B2 * | 3/2006 | Kadous et al. | 370/208 |
| 7,187,940 B2 * | 3/2007 | Kelley | 455/501 |
| 2003/0003880 A1 * | 1/2003 | Ling et al. | 455/92 |
| 2003/0125040 A1 * | 7/2003 | Walton et al. | 455/454 |
| 2005/0118958 A1 * | 6/2005 | Alexiou | 455/67.11 |
| 2006/0083295 A1 * | 4/2006 | Ahmed et al. | 375/222 |

OTHER PUBLICATIONS

IEEE Transactions on Information Theory, vol. 46, No. 3, 0018-9448/00; M. Médard; "The Effect upon Channel Capacity in Wireless Communications of Perfect and Imperfect Knowledge of the Channel"; May 2000; pp. 933-946.
IEEE Transactions on Communications, vol. 49, No. 12, 0090-6778/01; H. Sampath et al.; "Generalized Linear Precoder and Decoder Design for MIMO Channels Using the Weighted MMSE Criterion"; Dec. 2001; pp. 2198-2206.
IEEE Communications Letters, vol. 5, No. 6, 1089-7798/01; D. Ionescu et al.; "Predictive Closed-Loop Power Control for Frequency-Division Duplex Wireless Systems"; Jun. 2001; pp. 248-250.

(Continued)

*Primary Examiner*—Quochien B Vuong
(74) *Attorney, Agent, or Firm*—Ware, Fressola, Van Der Sluys & Adolphson, LLP (57) ABSTRACT

In a MIMO delay spread (OFDM) system or a MIMO single carrier (non-OFDM) system wherein a transmitter transmits signals to a receiver through multipath fading channels, an equivalent frequency-domain MIMO multipath channel matrix is used to estimate the maximum mutual information regarding the relationship between transmitted signals and received signals. It is possible to compute the upper bound of the maximum mutual information at least based on the total energy of all resolvable paths in the fading channels. The upper bound or the changes in the upper bound can be used to adjust the transmission parameters used in data transmission. The transmission parameters include the modulation order in the modulation process, the code rate and the puncturing rate.

23 Claims, 3 Drawing Sheets

OTHER PUBLICATIONS

IEEE Transactions on Wireless Communications, vol. 3, No. 5, 1536-1276/04; D. Ionescu et al.; "Predictability of Uplink Channels From Downlink Channels in Frequency Division Duplex Systems: A Power Control Application"; Sep. 2004; pp. 1781-1788.

IEEE Transactions on Information Theory, vol. 49, No. 12, 0018-9448/03; M. Godavarti et al; "Capacity of a Mobile Multiple-Antenna Wireless Link with Isotropically Random Rician Fading"; Dec. 2003; pp. 3330-3334.

IEEE 0-7803-1901-X/94, Proceedings of the 1994 IEEE International Conference on Neural Networks; W. Fakhr et al.; "MMI Training of Minimum Complexity Adaptive Nearest Neighbor Classifiers"; Jun.-Jul. 1994; pp. 401-406.

IEEE 0-7803-7467-3, IEEE Vehicular Technology Conference; J. Wallace et al.; "Intrinsic Capacity of the MIMO Wireless Channel"; Sep. 2002; pp. 24-28.

\* cited by examiner

A
METHOD AND DEVICE FOR TRANSMISSION PARAMETER SELECTION IN MOBILE COMMUNICATIONS

FIELD OF THE INVENTION

The present invention relates generally to mobile communications and, more particularly, to a MIMO single carrier or delay spread system.

BACKGROUND OF THE INVENTION

Fourth generation (4G) mobile communications systems aim at achieving high data rates at relatively low costs. Throughput of 1 Gbps at local area or 10 Mbps for wide area result in high spectral efficiencies. Physical limitations due to higher propagation losses incurred at the higher carrier frequencies to be used in 4G systems result in smaller cell areas. Therefore, efficient resource allocation is crucial in achieving the targeted throughput while controlling the cost.

Bit loading and, in general, controlling the relevant transmission parameters are key methods for approaching the capacity limits, and thereby using the spectral resources efficiently. All bit and power allocation schemes require a measure of the mutual information during a time interval of interest, or some approximation thereof.

In the currently used systems, it is assumed that the channel state information in complex form is known or can be predicted. The complex form, with both magnitude and phase, permits calculation of the exact eigenvalues or singular values. However, if the frame (time interval where relevant transmission parameters are to be adapted) is long and the time-varying nature of the channel is pronounced, the adaptation based on the calculated eigenvalues or singular values becomes less reliable.

Thus, it is desirable and advantageous to provide a method for transmission parameters selection that is not dependent upon the singular value decomposition, or on the exact calculation of eigenmodes, eigenvalues or singular values.

SUMMARY OF THE INVENTION

The present invention makes use of the maximum mutual information between the transmitter side and the receiver side, and the upper bound of the mutual information in the selection of transmission parameters. In particular, the upper bound during a given transmission period is dependent on the total channel energy in all resolvable paths. The transmission parameters to be selected include the modulation order and the code rate. Thus, based on the increasing or decreasing trend in the maximum mutual information, it is possible to differentially adjust one or more of the transmission parameters. Said adjustment includes, but is not limited to, increasing and decreasing the transmission parameters.

Thus, the first aspect of the present invention provides a method for improving the use of spectral resources in a wireless communications network having at least a transmitter and a receiver, wherein the transmitter transmits signals in accordance with one or more transmission parameters to the receiver through one or more multipath fading channels having channel conditions subject to variations affecting reception of signals at the receiver, and wherein maximum mutual information regarding the relationship between the transmitted signals and the receiver signals can be estimated to indicate the variations in the channel conditions. The method comprises:

computing an upper bound on the maximum mutual information; and adjusting said one or more transmission parameters based on the computed upper-bound.

According to the present invention, the computed upper-bound is an achievable upper bound on the maximum mutual information during a given transmission interval.

According to the present invention, the achievable upper-bound is dependent on a total energy of all resolvable paths in the fading channels.

according to the present invention, the transmitted signals comprise modulated signals and the transmission parameters include a modulation order in the signal modulation process, and said adjusting comprises the reassignment of the modulation order.

According to the present invention, the transmitted signals comprise coded signals and the transmission parameters include a code rate in the signal coding process, and said adjusting comprises adjustment of the code rate.

According to the present invention, the method further comprises determining changes in the upper-bound of the maximum mutual information; and adjusting the transmission parameters based on the changes.

According to the present invention, the transmission parameters include one or more modulation constellations for use in association with a plurality of subsets of the set of all active subcarriers.

The second aspect of the present invention provides a wireless communications system, which comprises:

at least a receiver;

at least a transmitter for transmitting signals in accordance with one or more transmission parameters to the receiver through one or more multipath fading channels having channel conditions subject to variations, wherein maximum mutual information regarding the relationship between the transmitted signals and the receiver signals can be estimated to indicate the variations in the channel conditions; and a computation module, for computing an upper bound on the maximum mutual information so as to adjust said one or more transmission parameters based on the computed upper bound.

According to the present invention, the computation module is operatively connected to the transmitter for providing information indicative of the upper bound of the maximum mutual information so as to allow the transmitter to adjust said one or more transmission parameters, wherein the transmitter informs the receiver of the transmission parameters so adjusted.

Alternatively, the computation module is operatively connected to the receiver and the receiver has feedback channels for conveying information indicative of the upper bound of the maximum mutual information to the transmitter so as to allow the transmitter to adjust said one or more transmission parameters.

According to the present invention, the system is a MIMO delay spread system, or a MIMO single-carrier system.

The third aspect of the present invention provides an electronic device for use in a wireless communications network, wherein the network comprises:

at least a receiver; and at least a transmitter for transmitting signals in accordance with one or more transmission parameters to the receiver through one or more multipath fading channels having channel conditions subject to variations, and wherein maximum mutual information regarding the relationship between the transmitted signals and the receiver signals can be estimated to indicate the variations in the channel conditions. The electronic device comprises:

a computer readable medium;

a software program having codes embedded in the computer readable medium for computing an upper bound on the maximum mutual information, and a conveying channel for conveying to the transmitter information indicative of the upper bound on the maximum mutual information so as to allow the transmitter to adjust said one or more transmission parameters based on the computed upper bound.

According to the present invention, the electronic device may have a linkage to the transmitter for providing said conveying channel.

The fourth aspect of the present invention provides a software product embedded in a computer readable medium for use in a communications network, wherein the network comprises:

at least a receiver; and at least a transmitter for transmitting data in accordance with one or more transmission parameters to the receiver through one or more multipath fading channels having channel conditions subject to variations, wherein maximum mutual information regarding the relationship between the transmitted signals and the receiver signals can be estimated to indicate the variations in the channel conditions. The software program comprises the steps of:

acquiring knowledge of the channel conditions experienced by the transmitted data;

computing an upper bound on the maximum mutual information based on the knowledge so as to allow the transmitter to adjust said one or more transmission parameters based on the computed upper bound.

The fifth aspect of the present invention provides a network component for use in a communications network, wherein the network further comprises a plurality of other network components. The network component comprises:

a plurality of antennas;

a transmitter operatively connected to some of the antennas;

a receiver operatively connected to some of the antennas;

a data source for providing data to be transmitted by the transmitter through the antennas to at least one of the other network components in accordance with one or more transmission parameters to said other network components through one or more multipath fading channels; and a computation module for computing an upper bound of a maximum mutual information regarding the relationship between the transmitted data and data received by said network components affected by variations in the channel conditions so as to adjust the transmission parameters based on the upper bound.

According to the present invention, the network component is a mobile terminal.

Figure 1:
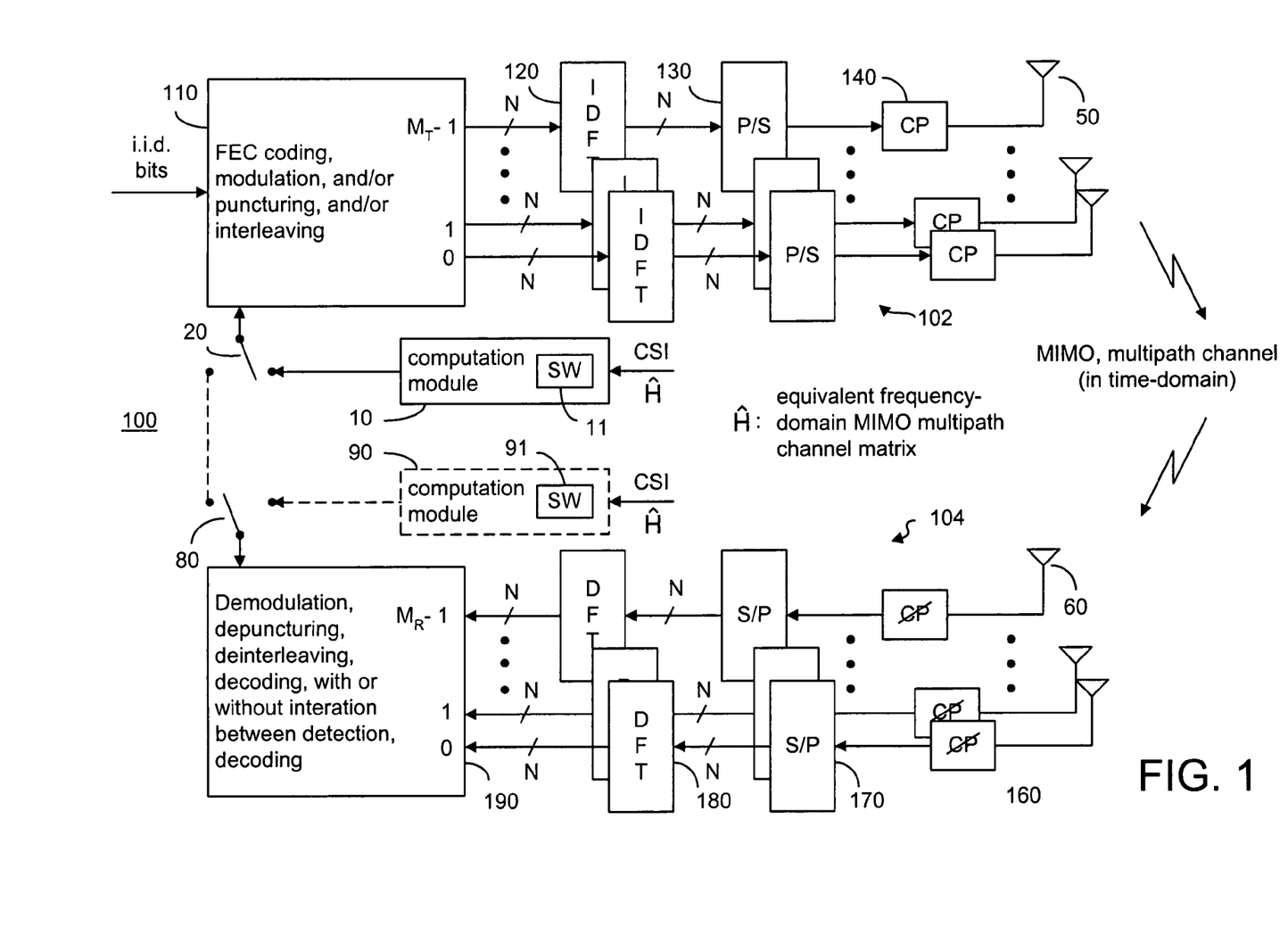
FIG. 1 is a block diagram showing a MIMO delay spread system that uses the adaptation method, according to the present invention.
Figure 2:
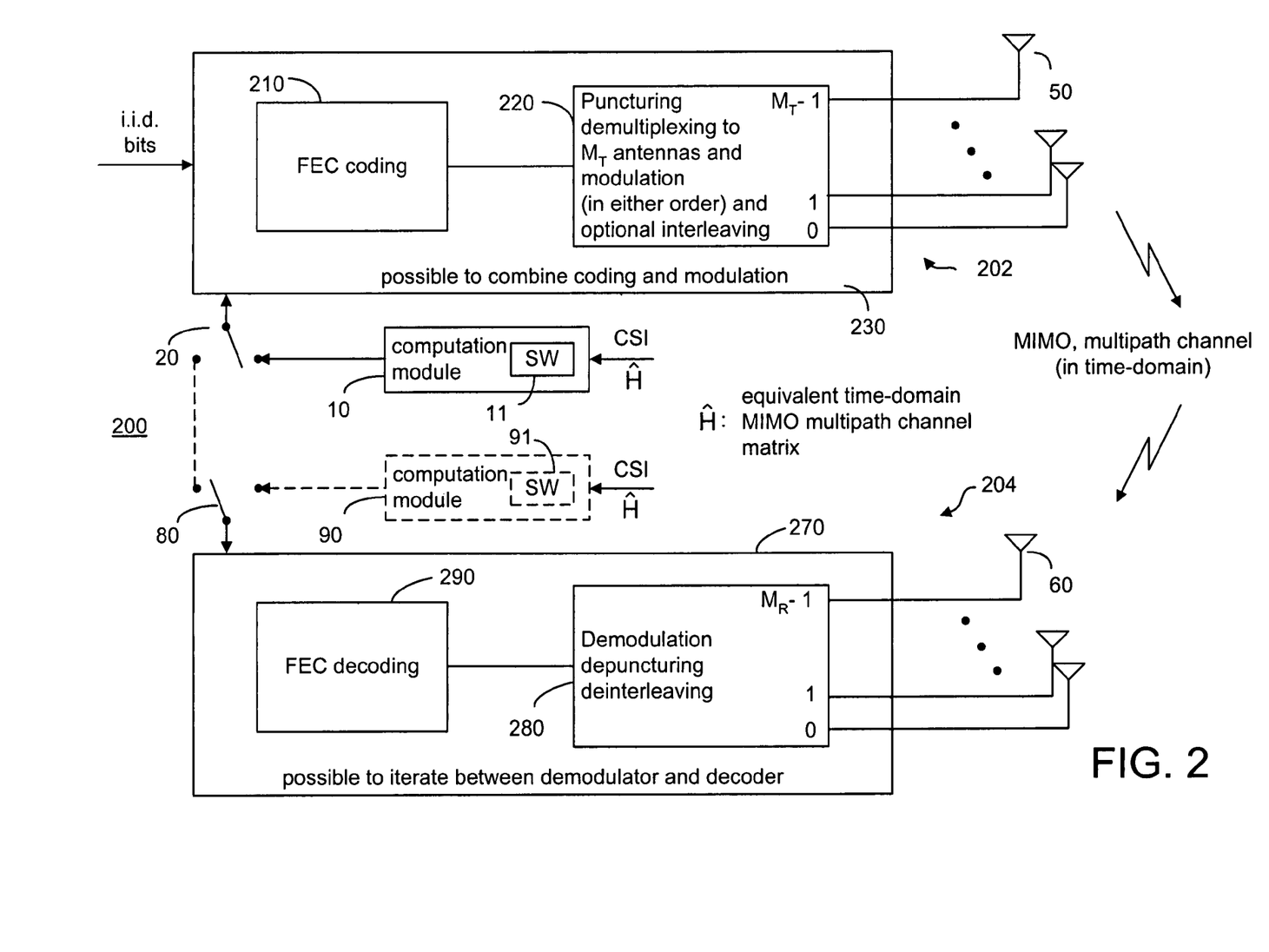
FIG. 2 is a block diagram showing a MIMO single carrier system that uses the adaptation method, according to the present invention.
Figure 3:
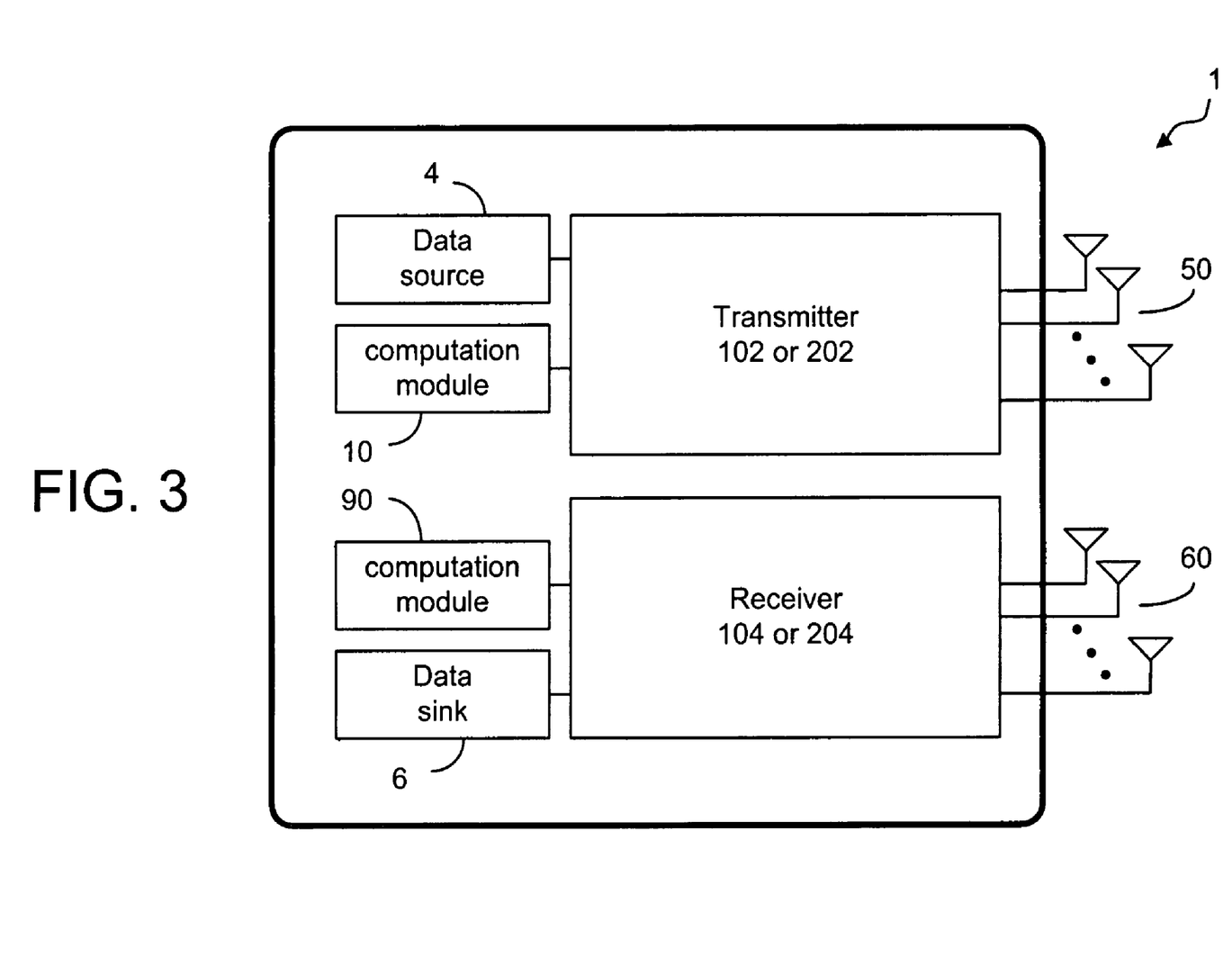
FIG. 3 is a schematic representation showing a mobile terminal in which the present invention can be implemented.

The present invention will become apparent upon reading the description taken in conjunction with FIGS. 1 to 3.

DETAILED DESCRIPTION OF THE INVENTION

The present invention provides an accessible measure of mutual information, which by its very nature changes slowly enough to be useful (it is well known that the channel's magnitude changes much slower than the channel's phase), exhibits the same monotonic trend as the maximum mutual information itself, and can be used to regulate mechanisms that control transmission parameters such as the modulation order, or the overall spectral efficiency and code rate—should coding be present.

The ability of a transmitter to make predictions about its own channel—e.g., from observations of an uncorrelated fading channel that shares the same predictor coefficients (perhaps up to a deterministic transformation)—enables it to perform water-filling on the eigenvalues of the channel's positive semi-definite Gram matrix (see Medard "The Effect upon Channel Capacity in Wireless Communications of Perfect and Imperfect Knowledge of the Channel", IEEE Trans. Inform. Theory, vol. IT-46, pp. 933-946, May 2000). In general, the Gram matrix of (the columns of) a matrix A is $A^H A$, where the superscript H denotes the Hermitian operator which performs complex conjugated transposition. Such a pair of channels that share their predictor coefficients could be the associated uplink and downlink channels in a frequency duplex scenario (see Ionescu et al. "Predictive closed-loop power control for frequency-division complex wireless systems", IEEE Commun. Letters, vol. 5, no. 6, pp. 248-250, June 2001; and Ionescu et al. "Predictability of Uplink Channels from Downlink Channels in Frequency Division Duplex Systems: A Power Control Application," IEEE Trans. Wireless Commun., vol. 3, September, 2004). The mutual information between transmitter and receiver when the channel is perfectly known both at the transmitter and at the receiver has been characterized (see Medard, for example). When channel prediction is an option, the ability to successfully perform water-filling optimization is strongly dependent on the ability to predict the complex channel values, in order to determine the appropriate eigenvalues (of the channel's positive semi-definite Gram matrix). So far, such an approach has been considered of limited interest, since the rate of change for the phases of the complex channel values renders a practical predictor unfeasible. The situation would be completely different if the relevant eigenvalues, and the water-filling approach itself, could be linked to the amplitudes of the channel samples—regardless of the number of resolvable paths—because the channel magnitude changes much slower than its phase. An achievable upper bound exists for the mutual information, which depends only on the total channel energy.

The maximum mutual information in the case of a perfectly known channel at both the sender and the receiver can be calculated as shown below. It should be noted that the following derivation refers to a single carrier system for the purpose of illustration only. The method and the system used in conjunction with this derivation are not limited to this embodiment.

It is known that a complex k×k' matrix $\underline{T}_{k'}^{k}$ can be used for baseband channel modeling of a single carrier system in frequency selective fading (see Medard), where $k'=\lfloor W'T \rfloor$, $k=\lfloor WT+\tilde{\Delta} \rfloor$, W' is the Nyquist rate at the channel's input (i.e., the passband bandwidth, shared by all propagation links/users), W is the Nyquist rate at the channel's output (i.e., W' increased by the largest Doppler spread taking into account channel variation bandwidth in all users), $\tilde{\Delta}$ accounts for the time spread due to multipath propagation, frequency selective fading, and T is the length of the relevant time interval, during which the mutual information is to be determined or maximized. For simplicity of presentation, let W'=W, and the continuum-time, discrete multipath, and time-varying channel impulse response admit a discrete-time model with resolvable paths located at (some) integer multiples of $W^{-1}$ in the delay domain. Thus, the matrix $\underline{T}_{k'}^{k}$ models, via a linear transformation, the combined effect of the channel and the sampling at the channel's input and output—to the effect that the complex (flat fading) coefficients of the resolvable paths appear along the columns of $\underline{T}_{k'}^{k}$ (perhaps after zero padding). Specifically, $\underline{T}[i,l]$ equals $\tilde{g}[i,i-l]$ when $0 \leq i-l \leq \Delta'$, and vanishes otherwise. Here g(t',t) is the channel response at time t' due to an impulse applied at t'-t, $\tilde{g}[\cdot,\cdot]$ is the appropriate discrete-time version of $g(\cdot,\cdot)$, and therefore $\tilde{g}[i,i-l]$ is the response—of a time-varying channel, taps at (some) multiples of the reciprocal of the Nyquist rate—at discrete time i, to an impulse applied at discrete time i−(i−l)=l. The important conclusions are that 1) the columns of $\underline{T}_{k'}^{k}$ represent non-cyclical shifts of the vector of complex, flat fading coefficients of the resolvable paths (perhaps padded with zeros), and therefore 2) the diagonal elements of the Hermitian matrix $(\underline{T}_{k'}^{k})^H \underline{T}_{k'}^{k}$ (i.e. norms of columns of $\underline{T}_{k'}^{k}$) represent the total channel energy values during different signaling intervals within the interval of length T where the mutual information is to be determined/maximized.

Finally, using the well-known isomorphism between the 2-by-2 matrices $$I_{max} = \frac{1}{2} \sum_{i=1}^{2k'} \ln\left(1 + \frac{u_i \lambda_i}{W N_0 / 2}\right), \quad (1)$$

where $$u_i = \left(\gamma - \frac{W N_0}{2\lambda_i}\right)^+ = \max\left\{0, \gamma - \frac{W N_0}{2\lambda_i}\right\}, \quad (2)$$

and the complex numbers a+jb, where $j=\sqrt{-1}$, one can work with the real, 2k×2k' matrices $\underline{T}_{2k'}^{2k}$, obtained from $\underline{T}_{k'}^{k}$ via the isomorphic transformation (one can simply replace each complex number with the corresponding 2-by-2 matrix, and in addition, employ a permutation of columns in order to avoid mixing the real parts with the imaginary parts. See Medard). Again, the total channel energy values during different signaling intervals—within the interval of length T where mutual information is to be observed—are given by the respective diagonal elements of the symmetric 2k'×2k' matrix $(\underline{T}_{2k'}^{2k})^T \underline{T}_{2k'}^{2k}$, where the subscript T denotes matrix transposition. Here $\lambda_1, \ldots, \lambda_{2k'}$ are assumed to be real, non-negative eigenvalues, ordered via $\lambda_1 \leq \lambda_2 \leq \ldots \leq \lambda_{2k'}$.

In this context, the maximum mutual information is given by $$\begin{bmatrix} a & -b \\ b & a \end{bmatrix}$$

$\gamma$ is defined via $$\sum_{i=1}^{2k'} u_i = TPW, \quad (3)$$

and P is the power constraint. Letting $$v_i = u_i / TPW, \text{ and } \zeta(x) = \ln(1 + 2TPx/N_0),$$

yields $$\sum_{i=1}^{2k'} v_i = 1 \quad (4)$$

$$I_{max} = \frac{1}{2} \sum_{i=1}^{2k'} \zeta(v_i \lambda_i). \quad (5)$$

Mutual Information Upper Bound as a Function of Total Channel Energy

Since the Euclidean norms of the columns of $\underline{T}_{2k'}^{2k}$ are the diagonal elements of the Hermitian 2k'×2k' matrix $(\underline{T}_{2k'}^{2k})^T \underline{T}_{2k'}^{2k}$ and the column norms represent total channel energy values, the vector of channel energies majorizes the vector of eigenvalues of $(\underline{T}_{2k'}^{2k})^T \underline{T}_{2k'}^{2k}$. Specifically, place the set of column norms in increasing order, and denote the resulting ordered values by $C_1 \leq C_2 \leq \ldots \leq C_{2k'}$. Furthermore, majorization is equivalent to the existence of a doubly stochastic matrix $S=[s_{il}]$ such that $[C_1 \ldots C_{2k'}]^T = S[\lambda_1 \ldots \lambda_{2k'}]^T$. Accordingly, $$C_i = \sum_{l=1}^{2k'} s_{il} \lambda_l.$$

Let $v_{max}$ be the largest among $v_1, \ldots, v_{2k'}$. Since $\zeta(v_{max}x)$ is concave with respect to x, and $C_i$ is a convex combination of the eigenvalues, $$\zeta(v_{max} C_i) \geq \sum_{l=1}^{2k'} s_{il} \zeta(v_{max} \lambda_i).$$

Then, because $v_{max} \leq 1$, we have $$\frac{1}{2} \sum_{i=1}^{2k'} \zeta(C_i) \geq \frac{1}{2} \sum_{i=1}^{2k'} \zeta(v_{max} C_i) \quad (6)$$

$$\geq \frac{1}{2} \sum_{i=1}^{2k'} \sum_{l=1}^{2k'} s_{il} \zeta(v_{max} \lambda_l)$$

$$\geq \frac{1}{2} \sum_{l=1}^{2k'} \zeta(v_{max} \lambda_l)$$

$$\geq \frac{1}{2} \sum_{i=1}^{2k'} \zeta(v_i \lambda_i)$$

where the double stochastic property of S is used.

Theorem 1.

$$I_{max} \leq \frac{1}{2} \sum_{i=1}^{2k'} \ln(1 + 2TPC_i/N_0).$$

The water-filling approach can thus be linked to the amplitudes of the channel samples—regardless of the number of resolvable paths—which change much slower than the respective phases. The gradient of the upper bound can subsequently be used as an indicator for adjusting transmission parameters, e.g. its rate, during an interval of length T when the channel energy seen by the receiver can be predicted at the transmitter.

Finally, by comparing the differential of $I_{max}$ with respect to the variables $$\bar{\omega}_i \stackrel{def}{=} u_i \lambda_i$$

on one hand, and the differential of the bound $$\frac{1}{2} \sum_{i=1}^{2k'} \ln(1 + 2TPC_i/N_0) \geq I_{max}$$

with respect to the variables $C_i$ on another hand, one immediately infers:

Theorem 2.

The dependence of $I_{max}$ on the variables that ultimately influence it exhibits the same monotonic trend as the dependence on $C_i$ of the bound (approximation)

$$\frac{1}{2} \sum_{i=1}^{2k'} \ln(1 + 2TPC_i/N_0) \geq I_{max}.$$

In other words, the bound/approximation increases/decreases if and only if the maximum mutual information itself increases/decreases. This means that the bound can be used in a different manner in any place where the (maximum) mutual information itself is useful in a different manner.

The above disclosure has proved that transmission parameters, such as the modulation order and the code rate (if coding is present) can be selected according to the upper bound on the maximum mutual information during a given transmission interval, where the bound depends essentially on the total channel energy. The approximation to the maximum mutual information, which is dependent on the total energy in all of the resolvable paths, can be monitored, for example, in order to establish an increasing or decreasing trend. Based on the trend, the modulation order, the code rate or the spectral efficiency can be differentially increased or decreased. The present invention can be also used in conjunction with a predictive scheme, across OFDM symbol boundaries, to adapt the transmission parameters when the channel is not static across multiple OFDM symbols. Furthermore, the present invention can be used in conjunction with those schemes based on error probability targets, as well as the schemes that lump together several subcarriers for the purpose of adapting coding and/or modulation.

It should be appreciated that the paths in above model can be the various paths pertaining to a MIMO system, as shown in FIGS. 1 and 2. Also, the complex channel matrix $\underline{f}_k^k$, sometimes denoted generically as H, can arise as an equivalent frequency domain MIMO channel matrix corresponding to the frequency selective time domain MIMO channel matrix that characterizes a multicarrier (OFDM) system. A discussion of the above equivalent representation can be found, e.g., in Sampath et al. "Generalized Linear Precoder and Decoder Design for MIMO Channels Using the Weighted MMSE Criterion," IEEE Trans. Commun., vol. 49, no. 12, pp. 2198-2206, December 2001.

FIG. 1 is a block diagram showing a MIMO delay spread (OFDM) system. As is well known in the art, orthogonal frequency division multiplexing is suitable for transmitting high bit rate data over indoor and outdoor communications systems. As shown in FIG. 1, the MIMO system 100 has a transmitter 102 and a receiver 104. On the transmitter side, source data in the form of i.i.d. (independently and identically distributed) bits are input to a signal processing block 110, which performs a plurality of processing functions including forward error correction (FEC) coding, and symbol mapping for modulating the coded signal onto $M_T$ orthogonal subcarriers. At the input of the inverse (Fourier) transform modules, N data-dependent complex points are present, wherein N is the number of transform module points and said complex points can originate from at least one constellation. The at least one constellation can be taken according to any phase-shift-keying (PSK) or quadrature-amplitude-modulation (QAM) signaling set, or any other set or sets of complex values known to both the transmitter and receiver. The processing block 110 may also perform puncturing and interleaving. In this embodiment, the $M_T$ signal streams from the processing block 110 are assumed to be in the frequency domain. A plurality of inverse transform modules 120 are used to convert the frequency domain signals to time domain signals. The time domain signals from each of the N-point inverse transform modules 120 are converted by a plurality of parallel-to-serial blocks 130. A plurality of CP blocks 140 are used to add a cyclic prefix (as a guard interval) to the converted time-domain signals for channel equalization purposes prior to conveying the signals to a plurality of antennas 50 for transmission. It should be noted that inverse transform can be carried out with IFFT (inverse fast Fourier transform) or IDFT (inverse discrete Fourier transform). Adding cyclic prefix to the data stream can be carried out prior to the P/S block. Furthermore, coding and modulation can be separated or combined. Interleaving can be performed on coded bits or on coordinates or groups of coordinates of the complex symbols, which are the result from the combined coding and modulation, for example. A computation module 10 having a software program 11 is used to derive the meaningful transmission parameters. The computation is either:

1) based on a global frequency-domain MIMO channel matrix ($\hat{H}$) in order to select some or all of the following:
   a. an overall codebook and the associated effective code rate,
   b. a puncturing rate,
   c. power for each transmitted stream, and
   d. either a common constellation (implicitly its size) for all subcarriers, or various constellations (implicitly their sizes) for various subcarriers.

The coding and modulation operations can be combined or separated. or 2) used on a subcarrier basis, in which case the encoding and modulation operations can be separated, in order to select the transmission power for each transmitted stream, and possibly different constellations (implicitly their sizes) for different subcarriers and streams.

In the above discussion, the transmitted streams refer to transmit antennas, or to eigenmodes if beamforming is used. The frequency-domain MIMO channel matrix is a matrix with the relevant MIMO blocks on the main diagonal corresponding to individual subcarriers.

On the receiver side, signals received from a plurality of antennas 60 are processed by a plurality of blocks 160 to remove the cyclic prefix. The CP-removed signals are converted by a plurality of serial-to-parallel blocks 170 into $M_R$ N-point data streams. Removing cyclic prefix can be carried out after the S/P block. These time-domain data streams are converted by a plurality of transform modules 180 into frequency domain signals. The frequency domain signals from the transform modules are demodulated and decoded by a block 190. The block 190 may also perform de-puncturing and de-interleaving.

It should be noted that the computation module 10 requires knowledge of the channel experienced by the transmitted data. When the computation module 10 is implemented at the transmitter, the channel state information (CSI) may need to be predicted with assistance from the receiver. In such a case, the derived transmission parameters are to be fed to the receiver. In case of link reciprocity (time division duplex (TDD) systems with appropriate angular spread etc., for example), prediction is not necessary because the uplink and downlink channels are the same.

The computation module can also be implemented only at the receiver, as the module 90 shown in FIG. 1. Similar to the computation module 10, the computation module 90 also has a software program 91 for deriving the meaningful transmission module. In this case, the derived transmission parameters must be fed back to the transmitter.

Feeding the transmission parameters is an implementation choice, as a tradeoff between information overhead (feedback channels) and complexity. Thus, it is possible to implement both the computation module 10 and the computation 90 at the respective sides, in case of link reciprocity—if complexity is preferred over information overhead.

FIG. 2 is a block diagram showing a MIMO single carrier (non-OFDM) system. The MIMO single carrier system 200 has transmitter 202 and a receiver 204. The difference between the non-OFDM system 200 and the OFDM system 100 is mainly in the form of the overall MIMO delay spread channel matrix ($\hat{H}$) and the absence of the IDFT/DFT (or IFFT/FFT) transformations. As shown in FIG. 2, the source data in the form of i.i.d. bits are fed to a signal processing block 230. The signal processing block 230 can be separated into an FEC coding block 210 and a modulation block 220. The modulation block 220 also carries out other functions such as puncturing, demultiplexing (to $M_T$ antennas) and possibly interleaving. On the receiver side, the signals received from the antennas are fed to a block 270. The block 270 can be separated into a FEC decoding block 290 and a demodulation block 280. The demodulation block 280 also carries out other functions such as de-puncturing and possibly de-interleaving. In addition it is possible that the demodulation block 280 carries out the function of iterating between demodulator and decoder.

In sum, the method for selecting transmission parameters, according to the present invention, does not depend on singular value decomposition, or on exact calculation of eigenmodes, eigenvalues or singular values. Because the channel's magnitude changes much slower than the channel's phase, the upper bound on the mutual information is less likely to be affected by the time-varying nature of the channel, or by the estimation/prediction errors. Accordingly, the usefulness of the measured upper bound is not likely to expire before the measure is adequately used. In predictive approaches, the channel magnitude can be accurately estimated in that the estimation errors are generally low. Although the present invention does not depend on the eigenvalues, the measure on the upper bound of the maximum mutual information retains the monotonic trend of the exact maximum mutual information as calculated using eigenvalues. The present invention can be used in other variations, such as inverse water filling approaches.

As with conventional OFDM systems, the method and device, according to the present invention, can be used for mobile or fixed wireless application. For example, OFDM can be used for digital television and radio broadcast and reception. The same technology can be used in a fourth-generation mobile communications network. FIG. 3 is a schematic representation showing a mobile terminal. The mobile terminal can also be used where a MIMO single system is desirable. Thus, the mobile terminal 1, as shown in FIG. 3, comprises a transmitter (102 or 202) operatively connected to a plurality of transmit antennas 50 for transmitting data streams to other network components. The mobile terminal 1 also comprises a data source 4 for providing high-rate data to be transmitted. The mobile terminal 1 further comprises a receiver (104 or 204) operatively connected to a plurality of receive antennas 60 for receiving data streams from other network components. The mobile terminal 1 has a data sink 6 for storing processed data from the receiver. The mobile terminal 1 comprises one or two computation modules (10, 90) for deriving transmission parameters.

What is claimed is:

1. A method for improving the use of spectral resources in a wireless communications network having one or more transmitters and one or more receivers, said method comprising:

computing an upper bound on maximum mutual information regarding a relationship between transmitted signals from a transmitter and received signals at a receiver, wherein the transmitted signals are transmitted in accordance with one or more transmission parameters to the receiver through one or more multipath fading channels having channel conditions subject to variations affecting reception of signals at the receiver, and wherein the maximum mutual information can be estimated to indicate the variations in the channel conditions; and adjusting said one or more transmission parameters based on the computed upper-bound.

2. The method of claim 1, wherein the computed upper-bound is an achievable upper bound on the maximum mutual information during a given transmission interval.

3. The method of claim 2, wherein the achievable upper-bound is dependent on a total energy of all resolvable paths in the fading channels.

4. The method of claim 2, wherein the transmitted signals comprise modulated signals and the transmission parameters include a modulation order in the signal modulation process, and wherein said adjusting comprises the reassignment of the modulation order.

5. The method of claim 2, wherein the transmitted signals comprise coded signals and the transmission parameters include a code rate in the signal coding process, and wherein said adjusting comprises adjustment of the code rate.

6. The method of claim 2, further comprising:

determining changes in the upper-bound of the maximum mutual information; and adjusting the transmission parameters based on the changes.

7. The method of claim 2, wherein the transmission parameters include one or more modulation constellations for use in association with a plurality of subsets of the set of all active subcarriers.

8. A wireless communications system, comprising:
a receiver;
a transmitter for transmitting signals in accordance with one or more transmission parameters to the receiver through one or more multipath fading channels having channel conditions subject to variations, wherein maximum mutual information regarding the relationship between the transmitted signals and the receiver signals can be estimated to indicate the variations in the channel conditions; and
a computation module, for computing an upper bound on the maximum mutual information so as to adjust said one or more transmission parameters based on the computed upper bound.

9. The system of claim 8, wherein the computation module is operatively connected to the transmitter for providing information indicative of the upper bound of the maximum mutual information so as to allow the transmitter to adjust said one or more transmission parameters.

10. The system of claim 9, wherein the transmitter informs the receiver of the one or more transmission parameters so adjusted.

11. The system of claim 8, wherein the computation module is operatively connected to the receiver and wherein the receiver has feedback channels for conveying information indicative of the upper bound of the maximum mutual information to the transmitter so as to allow the transmitter to adjust said one or more transmission parameters.

12. The system of claim 8, wherein the computed upper-bound is an achievable upper bound on the maximum mutual information during a given transmission interval.

13. The system of claim 12, wherein the achievable upper-bound is dependent on a total energy of all resolvable paths in the fading channels.

14. The system of claim 12, wherein the transmitted signals comprise modulated signals and the transmission parameters include a modulation order in the signal modulation process, and wherein said adjusting comprises the reassignment of the modulation order.

15. The system of claim 12, wherein the transmitted signals comprise coded signals and the transmission parameters include a code rate in the signal coding process, and wherein said adjusting comprises adjustment of the code rate.

16. The system of claim 12, wherein the transmission parameters include one or more modulation constellations for use in association with a plurality of subsets of the set of all active subcarriers.

17. The system of claim 8, comprising a MIMO delay spread system.

18. The system of claim 8, comprising a MIMO single-carrier system.

19. An electronic device for use in a wireless communications network, the network comprising:
a receiver; and
a transmitter for transmitting signals in accordance with one or more transmission parameters to the receiver through one or more multipath fading channels having channel conditions subject to variations, wherein maximum mutual information regarding the relationship between the transmitted signals and the receiver signals can be estimated to indicate the variations in the channel conditions, said electronic device comprising:
a computer readable medium;
a software program having codes embedded in the computer readable medium for computing an upper bound on the maximum mutual information; and
a conveying channel for conveying to the transmitter information indicative of the upper bound on the maximum mutual information so as to allow the transmitter to adjust said one or more transmission parameters based on the computed upper bound.

20. The device of claim 19, further comprising:
a linkage to the transmitter for providing said conveying channel.

21. A software product embedded in a computer readable medium for use in a communications network, the network comprising:
a receiver; and
a transmitter for transmitting data in accordance with one or more transmission parameters to the receiver through one or more multipath fading channels having channel conditions subject to variations, wherein maximum mutual information regarding the relationship between the transmitted signals and the receiver signals can be estimated to indicate the variations in the channel conditions, said software comprising the programming codes for:
acquiring knowledge of the channel conditions experienced by the transmitted data;
computing an upper bound on the maximum mutual information based on the knowledge so as to allow the transmitter to adjust said one or more transmission parameters based on the computed upper bound.

22. A network component for use in a communications network, the network further having a plurality of other network components, said network component comprising:
a plurality of antennas;
a transmitter operatively connected to some of the antennas;
a receiver operatively connected to some of the antennas;
a data source for providing data to be transmitted by the transmitter through the antennas to at least one of the other network components in accordance with one or more transmission parameters to said other network components through one or more multipath fading channels; and
a computation module for computing an upper bound of a maximum mutual information regarding the relationship between the transmitted data and data received by said network components affected by variations in the channel conditions so as to adjust the transmission parameters based on the upper bound.

23. The network component of claim 22, comprising a mobile terminal.

* * * * *